Jan. 17, 1956 R. R. MILLER 2,731,016
POULTRY BEAK CUTTING DEVICE
Filed June 11, 1954 2 Sheets-Sheet 1
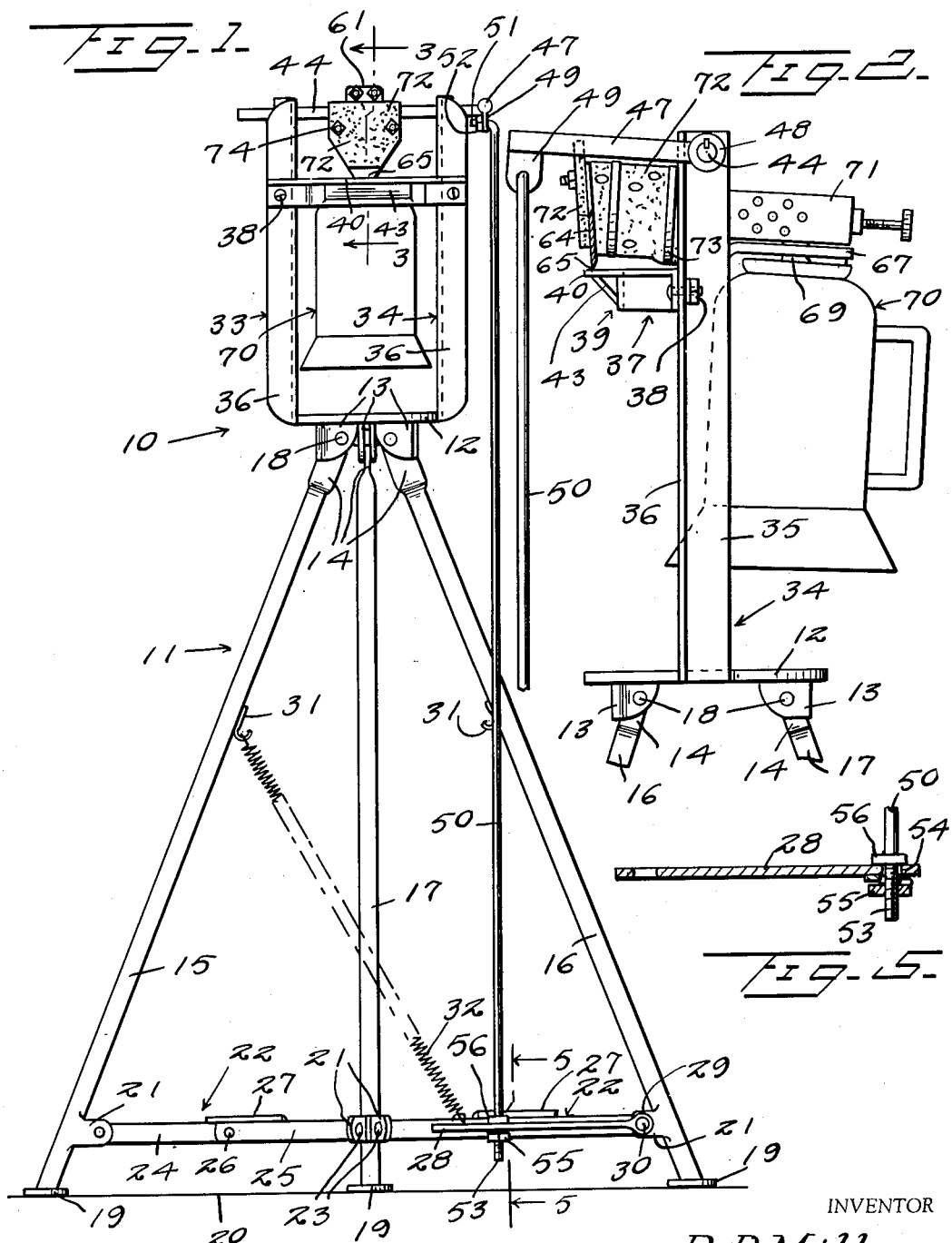
INVENTOR
R.R.Miller
BY John N. Randolph
ATTORNEY Jan. 17, 1956  R. R. MILLER  2,731,016
POULTRY BEAK CUTTING DEVICE
Filed June 11, 1954  2 Sheets-Sheet 2
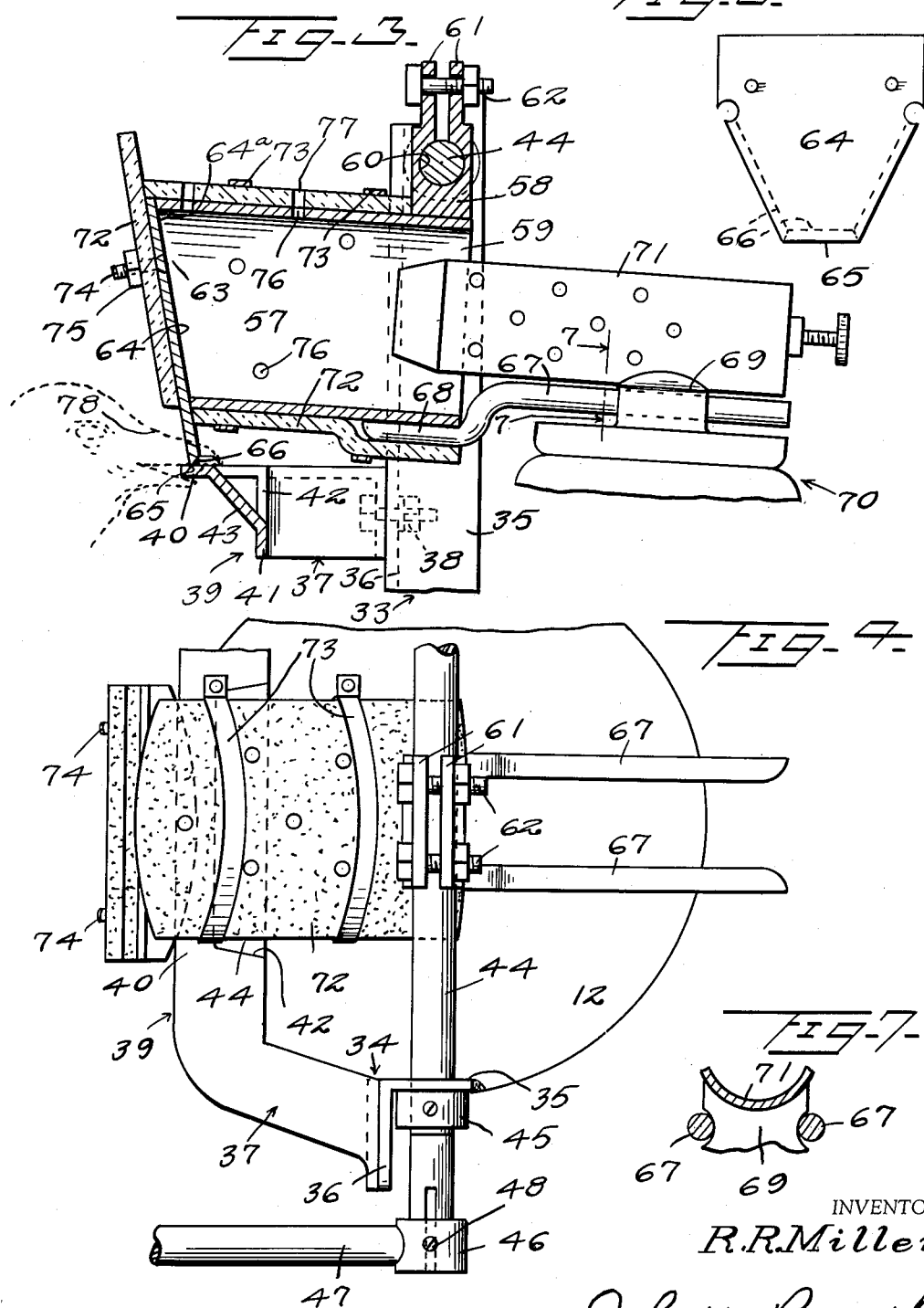
INVENTOR
R. R. Miller
BY John N. Randolph
ATTORNEY

United States Patent Office 2,731,016
Patented Jan. 17, 1956

2,731,016

POULTRY BEAK CUTTING DEVICE

Roy R. Miller, Merrill, Oreg.

Application June 11, 1954, Serial No. 436,113

4 Claims. (Cl. 128—303.1)

This invention relates to a novel device for de-beaking or trimming the beaks of poultry and has for its primary object to provide a device of such character adapted to be operated for efficiently cutting or trimming the beaks of poultry and for substantially simultaneously searing the laceration.

More particularly, it is an aim of the present invention to provide a beak trimmer or cutter which may be readily operated by one person while holding a fowl in a position for cutting or trimming the beak thereof.

Another object of the invention is to provide such a device which is completely portable and includes a self-contained heat source which is detachably supported thereon.

A further object of the invention is to provide a poultry beak trimmer or cutter provided with supporting legs for supporting the cutting and searing unit thereof at a convenient level for use by an adult in an upright standing position.

Various other objects and advantages of the invention will hereinafter become more fully apparent from the following description of the drawings, illustrating a presently preferred embodiment thereof, and wherein:

Figure 1 is a front elevational view of the beak cutting or trimming apparatus showing the blade in the position assumed thereby at the completion of a cutting stroke;

Figure 2 is an enlarged fragmentary side elevational view of the upper portion of the apparatus looking from right to left of Figure 1;

Figure 3 is an enlarged fragmentary vertical sectional view taken substantially along a plane as indicated by the line 3—3 of Figure 1;

Figure 4 is a fragmentary top plan view, on an enlarged scale, of a portion of the apparatus with the heating unit removed;

Figure 5 is an enlarged fragmentary cross sectional view of a portion of the foot pedal, taken substantially along a plane as indicated by the line 5—5 of Figure 1;

Figure 6 is a front elevational view of the cutting blade, removed from the device, and Figure 7 is a fragmentary cross sectional view taken substantially along a plane as indicated by the line 7—7 of Figure 3.

Referring more specifically to the drawings, the beak cutting and trimming device in its entirety and comprising the invention is designated generally 10 and as illustrated in Figure 1, includes a tripod-type support, designated generally 11. The support 11 includes a top portion 12, preferably in the form of a substantially flat top plate which is provided on its underside with three slotted brackets 13 in which the flattened upper ends 14 of the three legs 15, 16 and 17 of the support 11 are loosely received. Pivot pins 18 extend through the individual brackets 13 and through the leg ends 14 disposed therein, for swingably connecting said legs to the top portion 12. The closed outer ends of the brackets 13, as seen in Figures 1 and 2, prevent the legs 15, 16 and 17 from swinging outwardly beyond their extended or open positions, as seen in Figure 1. Said legs are provided with foot portions 19, suitably secured to the lower ends thereof and so arranged, relatively to the legs, as to be disposed coplanar, when the legs are in extended positions, resting flush on a supporting surface 20, as seen in Figure 1.

Each of the legs 15, 16 and 17, near its lower end, is provided with a pair of ears 21, as seen in Figure 1, which ears of each leg are disposed at an acute angle relatively to one another so that the ears of each leg extend toward the other two legs and each align with an ear of another leg, when said legs are in extended positions. Corresponding ends of two leg braces, designated generally 22, are pivotally connected as seen at 23 to the two ears 21 of the rear leg 17 and extend therefrom toward the two front legs 15 and 16 and are similarly connected by a pivot means, not shown, to ears 21 of said front legs which align with the two ears 21 of the rear leg. Each brace 22 is composed of two sections 24 and 25 having overlapping adjacent ends pivotally connected as seen at 26 to form a knee joint. One section of each brace, as for example the section 25, is provided with a laterally projecting flange 27 at its upper edge, which overlies the upper edge of the other brace section 24, at the knee joint 26 of the brace, to prevent the brace sections 24 and 25 from swinging downwardly past aligned positions, as seen in Figure 1, and so that the knee joints of the braces can only be broken upwardly for swinging the legs 15, 16 and 17 inwardly to collapsed positions.

An elongated, relatively wide foot pedal or treadle 28 has a restricted apertured end 29 through which a pivot pin 30 extends. The pin 30 is disposed with its axis substantially parallel to the plane of the pedal 28 and engages the other ear 21 of the front leg 16, on which said pedal 28 is thus supported for vertical swinging movement about the pin 30 as a horizontal axis. Said ear 21, which is engaged by the pin 30 extends toward the other front leg 15 and the pedal 28 likewise extends from said ear 21 toward the other front leg 15. The front legs 15 and 16 have upwardly opening hooks 31 secured to their inner sides and preferably located nearer the upper ends than the lower ends of said legs. A contractile means, such as a pull spring 32, has an upper end anchored to the hook 31 of the leg 15 and a lower end connected to the pedal 28, near its free end, for urging the pedal 28 to swing upwardly. The pedal 28 is shown in Figure 1 disposed to be operated by a downward pressure applied with the right foot. However, if preferred, the pedal 28 could be mounted in the same manner as previously described on the other ear 21 of the other front leg 15 to extend toward the front leg 16 and the contractile means 32 could then be attached to the hook 31 of the leg 16, so that the pedal 28 could then be operated with the left foot.

A pair of uprights 33 and 34, preferably formed of angle iron, are secured in any manner, as by welding, at their lower ends to side portions of the top part 12, between the rear leg 17 and the front legs 15 and 16. The uprights 33 and 34 extend upwardly from the top portion 12 and have substantially parallel inner flanges 35 and substantially coplanar front flanges 36, which extend outwardly from forward edges of the inner flanges 35. A member 37, formed of angle iron, extends across the front of the uprights 33 and 34, near to but spaced from their upper ends and has end portions disposed against the front faces of said front sides 36 and secured thereto by fastenings 38. Said member 37 has a forwardly offset intermediate portion 39 including a forwardly extending top flange 40 forming an anvil, as best illustrated in Figures 2, 3 and 4. Said top flange or anvil portion 40 and the depending rear flange 41 of said front portion 39 are cut away at their inner and upper portions, respectively, as seen at 42 (Figures 3 and 4) and the flanges 40 and 41 of the cutaway portion 42 are connected at their adjacent edges by a downwardly and rearwardly inclined wall portion 43 of said front portion 39. The anvil portion 40 is disposed between the upper end of said wall portion 43 and the forward edge of the top flange 40 of said forwardly offset portion 39.

A shaft 44 extends through and is journaled in the inner flanges 35 adjacent the upper ends of the uprights 33 and 34, as seen in Figures 2 and 3. Retaining collars 45 are adjustably fixed to the shaft 44 and bear against remote faces of said inner sides 35 to permit the shaft 44 to turn in the uprights 33 and 34 but to prevent sliding movement thereof relatively to said uprights. The shaft 44 has corresponding ends spaced outwardly from the uprights 33 and 34 for selectively receiving a sleeve or collar 46 fixed to an inner end of an arm or lever 47. The sleeve or collar 46 carries a setscrew or the like 48 for securing it detachably but immovably to either end of the shaft 44. An arm or lever 47 is shown secured to the right-hand end of the shaft 44 as seen in Figure 1. The arm or lever 47 extends forwardly from the shaft 44 and is provided at its outer end with a depending apertured ear 49, which is disposed over a portion of the pedal 28. A connecting rod 50 has a laterally turned upper end 51 which extends through and is journaled in the aperture of the ear 49, as seen in Figures 1 and 2, and which carries a nut or other stop 52 for retaining said rod end 51 turnably in engagement with the ear 49. The rod 50 is provided with a threaded lower end 53 which extends downwardly through one of a pair of openings 54, as seen in Figure 5, in the pedal 28 and which is loosely retained in engagement with the pedal 28 by a nut 55 engaging said threaded lower end 53, beneath the pedal 28, and a collar 56 which is fixed to the rod 50 and which is disposed above the pedal 28.

A metal tube 57 has an upstanding clamp projection 58 located adjacent its open rear end 59. The clamp 58 has a split bore portion 60 through which a portion of the shaft 44 extends. The clamp 58 has upstanding spaced apertured ears 61, adjustably connected by nut and bolt fastenings 62 for restricting the split bore portion 60 for securing the clamp immovably on the shaft 44. The tube 57 is adjustably supoprted by engagement of the clamp 58 with the shaft 44, beneath said shaft and between the uprights 33 and 34 and extends forwardly with respect to said uprights and has an open forward end 63 disposed over the anvil 40. Said open forward end 63 of the tube 57 is closed by a blade 64 which is suitably secured thereagainst, as by means of welding, as seen at 64a. Said forward tube end 63 is inclined downwardly and inwardly so that the plane of the blade 64 is similarly inclined, as seen in Figures 2 and 3. The blade 64 has tapered side edges and a straight transverse bottom edge. The straight transverse bottom edge 65 and said downwardly converging side edge portions are beveled, preferably on the inner side of the blade 64, as seen at 66.

A pair of laterally spaced arms 67 have downwardly offset forward ends 68 which are disposed beneath and suitably secured to the bottom portion of the rear end 59 of the tube 57, so that the arms 67 extend rearwardly from the open rear end 59 of said tube. The arms 67 are adapted to receive therebetween a grooved neck portion 69 of a conventional blowtorch 70, the tank of which is thus suported beneath the arms 67 and the mixing nozzle 71 of which is disposed above and longitudinally of the arms 67 and so that its discharge end extends into the open rear end 59 of the tube 57. The arms 67 are sufficiently resilient so that said arms are sprung slightly apart to receive the groove neck 69, the width of which is slightly greater than the spacing between said arms, to releasably and resiliently clamp the neck in the arms 67 for detachably supporting the blowtorch 70 on said arms. The tube 57 is substantially enclosed in a wrapping 72 of a heat insulating material such as asbestos, which may be secured therearound in any suitable manner as by means of metal straps 73, or by strands of wire having twisted ends. A pair of threaded studs 74 are fixed to and project outwardly from the blade 64 through another piece of the same material 72, which covers the outer side of the blade 64 down to adjacent its bottom edge 65 and which is disposed entirely over the forward end 63 of the tube 57. The last mentioned asbestos piece 72 is releasably held against the outer side of the blade 64 by nuts 75 which engage the threaded studs 74. The tube 57 is provided with a plurality of vent openings 76 and the asbestos 72, disposed therearound, is provided with with openings 77 which register with said openings 76. Air is also admitted to the tube 57 through its open rear end 59 around the discharge end of the nozzle 71.

From the foregoing it will be apparent that with the blowtorch 70 in operation a flame will be ejected from the discharge end of the nozzle 71 thereof into the tube 57 toward and against the blade 64 for heating said blade. The spring 32 will normally displace the pedal 28 upwardly from its position of Figure 1 so that the rod 50 will swing the lever 47 upwardly to turn the shaft 44 clockwise as seen in Figure 3 to swing the tube 57 and blade 64 upwardly from their positions of Figures 2 and 3. The operator may then employ both hands to grasp a fowl and so as to position the upper half 78 of the fowl's beak above a part of the anvil surface 40, as illustrated in Figure 3. The operator while holding the fowl with both hands thus positioned, exerts a downward pressure with the foot on the pedal 28 to cause the tube 57 and blade 64 to be swung downwardly, due to the downward pull exerted by the rod 50 on the outer end of the lever 47. This will cause the bottom cutting edge 65 to cut off or trim the upper half 78 of the beak. At the same time, the heated blade will sear the laceration made in the beak, simultaneously with the cutting stroke. The wall 43 provides an inclined surface down which the cut off beak portion slides away from the fowl. The asbestos covering of the tube 57 and blade 64 will result in a maximum heating of the bottom portion of the blade 64 which accomplishes the searing of the beak laceration. Obviously, the apparatus may be used for cutting or trimming both halves of the beak, if desired, as well as for other similar operations. It will also be understood that the heating unit 70 may be omitted where a searing or cauterizing of the laceration is not required or other forms of heating means may be substituted for the unit 70. However, the unit 70 provides a self-contained source of heat making the apparatus 10 completely portable.

Various other modifications and changes are contemplated and may obviously be resorted to, without departing from the spirit or scope of the invention as hereinafter defined by the appended claims.

I claim as my invention:

1. A poultry beak cutting and cauterizing device comprising an elongated substantially upright support, a knife, means swingably supporting said knife in an upper part of said support for vertical swinging movement of the knife, said support including a fixed anvil surface disposed beneath said knife, said knife having a sharpened bottom edge swingably movable toward and away from said anvil surface, means for heating said knife carried by said supporting means, and manually actuated means connected to said supporting means for swinging the supporting means and knife to move the knife downwardly and toward said anvil for cutting off a portion of a fowl's beak disposed between the bottom cutting edge of the knife and said anvil and for cauterizing the laceration simultaneously with the cutting stroke, said supporting means including a shaft journaled in the upper portion of said support, a tube having one end fixed to and suspended beneath said shaft, said tube extending transversely from the shaft and having an opposite end disposed remote from the shaft and against which the knife is secured and from which the cutting edge of the knife depends, said tube being formed of a heat conducting material, and a portion of said heating means extending into the first mentioned tube end.

2. A poultry beak cutting and cauterizing apparatus as in claim 1, a pair of laterally spaced spring arms fixed to and extending from said first mentioned end of said tube and detachably supporting said heating means in laterally spaced relation to the shaft so that the heating means counterbalances the tube and knife for urging the knife upwardly and away from the anvil, said heating means comprising a blowtorch, and said heating means portion constituting the discharge end of the blowtorch nozzle and being disposed to discharge into said tube toward said knife.

3. A poultry beak cutting and cauterizing apparatus as in claim 2, and heat insulating material disposed around said tube and against an outer surface of said knife from its upper end to adjacent its lower cutting end.

4. An apparatus of the character described comprising an elongated substantially upright support, a shaft journaled in the upper portion of said support, a tubular knife supporting member secured to said shaft and projecting transversely therefrom, a knife blade fixed to and disposed against an end of said supporting member and remote from the axis of said shaft and having a depending bottom cutting edge, an anvil fixed to said support and disposed beneath said bottom cutting edge, a blowtorch, means connecting the blowtorch to the supporting member for supporting the blowtorch beyond the other end of the supporting member to counterbalance the weight of the supporting member and knife for urging the knife upwardly and away from the anvil, said connecting means positioning the blowtorch with the nozzle thereof extending into the last mentioned end of the supporting member to discharge toward the knife, and manually actuated means connected to an end of said shaft for turning the shaft in one direction for swinging the knife downwardly for moving the cutting edge thereof toward and into engagement with the anvil.

References Cited in the file of this patent

UNITED STATES PATENTS

| 988,140 | Phillips | Mar. 28, 1911 |
| 2,384,875 | Barton | Sept. 18, 1945 |
| 2,385,633 | Lyon | Sept. 25, 1945 |
| 2,493,790 | Walczak | Jan. 10, 1950 |